United States Patent [19]

Paul et al.

[11] Patent Number: 4,705,570
[45] Date of Patent: Nov. 10, 1987

[54] METHOD OF MANUFACTURING A BONDED PARTICULATE ARTICLE BY REACTING A POLYOL AND A METEROCYCLIC COMPOUND

[75] Inventors: Albert P. Paul, Teaneck, N.J.; Roger J. Card, Stamford, Conn.

[73] Assignee: American Cyanamid Company, Stamford, Conn.

[21] Appl. No.: 795,067

[22] Filed: Nov. 5, 1985

[51] Int. Cl.$^4$ .......................... C08L 89/00; B28B 7/28
[52] U.S. Cl. ................................. 106/124; 106/38.4; 106/38.51; 106/162; 106/204; 106/214
[58] Field of Search ............... 106/214, 124, 162, 204; 523/145; 524/47

[56] References Cited

U.S. PATENT DOCUMENTS

| | | | |
|---|---|---|---|
| 4,343,655 | 8/1982 | Dodd et al. | 106/214 |
| 4,400,480 | 8/1983 | Silano et al. | 524/47 |
| 4,600,439 | 7/1986 | Schneider et al. | 106/214 |

Primary Examiner—Theodore Morris
Attorney, Agent, or Firm—Michael J. Kelly; Henry C. Jeanette; Frederick R. Cantor

[57] ABSTRACT

Disclosed herein is a method of manufacturing a bonded particulate article by admixing particulate material with a binder system, the binder system being formed by admixing a polyol selected from the group comprising a saccharide, a saccharide polymer, and a glyco protein with a heterocyclic compound of the formula

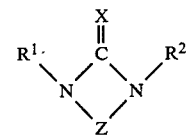

wherein $R^1$ and $R^2$ are, independently, aryl of from 6 to 12 carbon atoms, alkyl of from 1 to 6 carbon atoms or substituted alkyl of from 1 to 6 carbon atoms wherein the substituting group is hydroxy, alkoxy of from 1 to 6 carbon atoms, hydroxyalkoxy of from 1 to 6 carbon atoms, cyano, carboxy, carbalkoxy of from 1 to 7 carbon atoms or carbamoyl, or when $R^1$ is $-C_xH_{2x}-$, $R^2$ is $-C_xH_{2x}O-$, x being from 1 to 7, X is oxygen, sulfur or imino and Z is a divalent bridging radical, with a solvent, and an acid effective to control the rate of crosslinking between said polyol and said heterocyclic compound; forming the admixture in a shape; and curing to form the bonded article.

9 Claims, No Drawings

METHOD OF MANUFACTURING A BONDED PARTICULATE ARTICLE BY REACTING A POLYOL AND A METEROCYCLIC COMPOUND

CROSS-REFERENCE TO RELATED APPLICATION

This application is related to the concurrently filed U.S. patent application of Albert Peter Paul, Richard Adolph Szarz and Roger John Card, attorneys Docket No. 110-129 (30,145).

FIELD OF THE INVENTION

This invention relates to a method of manufacturing a bonded particulate article by admixing a heatcurable binder with particulate material. More particularly, this invention relates to the use of particulate material such as sand or cellulose fiber, with a binder system formed from a polyol, a heterocyclic compound of a formula to be specified, and an acid catalyst in an amount sufficient to allow the crosslinking reaction between the compounds to proceed. Articles produced by the procedure have utility as foundry cores and molds, and in the production of pressed fiber board.

BACKGROUND OF THE INVENTION

It has long been the practice in both the textile and paper industries to apply starch solutions to the fibers for various purposes. The ultimate properties of such products have been improved by crosslinking the starch with polyfunctional compounds, such as glyoxal, and the like. With the advent of heat-hardenable resins such as urea and melamine resins, it became desirable to mix such resins with the starch to obtain an even more durable finish. Ultimately, heterocyclic reaction products of (i) alpha, beta dicarbonyl compounds, (ii) urea, thiourea or guanidine and (iii) an aldehyde, e.g., formaldehyde, assumed an important position in the art of textile finishing. In Richardson, U.S. Pat. No. 2,661,312, for example, a stable, curable finish for textiles comprises 1,3-bis-(hydroxymethyl)-2-imidazoline, starch and tartaric acid. The heterocyclic compound is made, for example, by reacting ethyleneurea with formaldhyde and has two nitrogen-bonded methylol groups which are capable of cross-linking the starch, when heated, the rate of cross-linking being promoted by the presence of tartaric acid. Important state-of-the-art textile finishes also have evolved from such technology. In v. Reibnitz, U.S. Pat. No. 2,764,573, condensation products of glyoxal and ureas, thioureas or guanidines (glyoxal monoureins) are modified by reaction with aldehydes, e.g., formaldehyde, or aldehydes and an alcohol, and there are produced the corresponding N-substituted alkylol or alkoxyalkyl substitutents. The resins are shown to cure, especially after the addition of acid hardening catalysts, to waterproof and elastic films. It has subsequently been discovered and is known in the art that the glyoxal monourein and aldehyde condensation products are of great importance when used to treat textiles. In Gagliardi et al, U.S. Pat. No. 3,209,010, it is disclosed that such materials, especially when further substituted on the 4- and 5-positions by ether, ester, carbamoyl groups, and the like, provide chlorine-resistant finishes on textiles.

The crosslinking of polyhydroxyl compounds, particularly polysaccharides like starch, with multifunctional reagents reactive with hydroxyl groups is known outside of the textile field, such as in the manufacture of paper board from wood and other fibers and foundry molds from sand.

Foundry cores and molds present unique problems. These are used in making metal castings and are normally prepared from a composition including sand or other refractory material and a curable or polymerizable binder coated on the refractory particles. The purpose of this binder coating is to permit the mixture to be hardened after it is first shaped or molded into a desired form. Shaping of the composition, which usually comprises a major amount of sand and a minor amount of binder, is accomplished through ramming, blowing, or otherwise introducing the mixture into a pattern or core box to thereby assume the shape defined by the adjacent surfaces of the pattern. Then, by using a catalyst or polymerization accelerator introduced before or after the sand mix has been introduced into the pattern, and/or by using heat, the binder is caused to cure, thereby converting the shaped foundry mix into a hard, solid foundry core. This curing is usually accomplished either in the original core box, in a gassing chamber, or in a holding pattern. Commonly used binders include such materials as phenolic resins, urea-formaldehyde resins, furfural alcohol modified urea-formaldehyde resins, furan resins, drying oils and urethane oils.

Generally speaking, two basic techniques exist in the art for effecting a cure once the sand-binder mixture is shaped. The first of these techniques, the elevated temperature method, involves the use of heatcurable resin system wherein heat is used to effect hardening of the binder. The second technique is known in the art as the "no-bake" or "cold-setting" process. As its name implies, the latter process is carried out at room temperature or slightly above, i.e., 5°–50° C. and more often between 15°–35° C.

Each of these systems has its own set of limitations which are well known to those active in the field. Some materials are very energy intensive; some pose significant handling and environmental problems; some have limited utility because gas evolution from the binder during metal pouring creates surface defects in the finished metal article; and, if the cores are to be baked, green strength additives must be used so that the cores have sufficient strength to be put into and through an oven.

In Cummisford et al., U.S. Pat. Nos. 4,013,629; 4,089,691; 4,098,615; 4,098,859 and 4,158,574, are disclosed the use of the catalyzed glyoxal saccharide system in foundry sand cores, cellulose press formed products, adhesives, coating binders and in many other areas. The developments in these patents overcome many problems by controlling the amounts of reactants and catalyst and by selecting the saccharide from the wide range of materials available. In practice, however, the ultimate products are somewhat deficient in hydrolytic stability, which limits the use of these binder systems to foundries in which the temperature and humidity can be controlled.

Further representative of the state of the art are Nishikawa et al, U.S. Pat. No. 4,482,654 who coat foundry sand grains with a binder comprised of methylolmelamine or alkylated methylolmelamine and a water soluble polyol, e.g., hydroxymethyl cellulose. Sand molds having a water soluble binder containing sucrose, urea, methylolmelamine or alkylated derivatives and an acidic crosslinking catalyst are disclosed in Japanese Patent Publication No. 59,185,542, Oct. 22, 1984, Chem.

Abs. Vol 102:99473r (1985); binders for molding sand consisting of methylolmelamine precondensed with a saccharide are disclosed in French Patent Publication, Apr. 11, 1980 Chem. Abs. Vol 96:108797m (1982); and glucose mixed with methylated methylolmelamine and used as a binder for foundry sand is described in Japanese Patent Publication No. 57,124,542, Aug. 3, 1982; Chem. Abs. Vol 98:7323q (1983). All such systems show mainly hydrolytic stability problems common to the starch-glyoxal system mentioned above and there still exists the need for improved binder resins.

It has now been discovered, and is the subject of this invention, that binders prepared from polysaccharides and the condensation products of alpha, beta diketones, or alpha, gamma-diketones, urea or a sulfur or nitrogen analog thereof, or an N-substituted derivative thereof, optionally further condensed with an aldehyde or an aldehyde and an alcohol have remarkably beneficial properties. It is important, especially when using such binders with non-alkaline sands, to include an acid crosslinking catalyst in the composition.

SUMMARY OF THE INVENTION

According to the present invention there is provided a curable composition adapted to produce a shaped bonded particulate article, said composition comprising
(i) a particulate material; and, as a binder therefor,
(ii) a polyol selected from a saccharide, a saccharide polymer, a glyco protein, or mixtures of any of the foregoing;
(iii) a crosslinker for said polyol (ii) comprising a compound of the formula

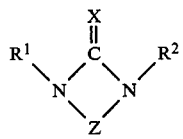

wherein $R^1$ and $R^2$ are, independently, aryl of from 6 to 12 carbon atoms, alkyl of from 1 to 6 carbon atoms or substituted alkyl of from 1 to 6 carbon atoms wherein the substituting group is hydroxy, alkoxy of from 1 to 6 carbon atoms, hydroxyalkoxy of from 1 to 6 carbon atoms, cyano, carboxy, carbalkoxy of from 1 to 7 carbon atoms or carbamoyl, or when $R^1$ is $-C_xH_{2x}-$, $R^2$ is $-C_xH_{2x}O-$, x being from 1 to 6, X is oxygen, sulfur or imino and Z is a divalent bridging radical;
(iv) an acid catalyst; and
(v) a solvent for the binder.

Also contemplated is a method of manufacturing a bonded particulate article comprising the steps of
(i) admixing particulate material with a binder system, the binder system being formed by admixing a polyol selected from a saccharide, a saccharide polymer, a glyco protein, or mixtures of any of the foregoing, a crosslinker of the formula above defined, a solvent, and an acid;
(ii) forming the admixture into a shape; and
(iii) curing the shape into a bonded article.

Also contemplated is a cold-cast procedure comprising the steps of
(i) admixing a particulate material with a binder system wherein the latter is formed by admixing a saccharide-containing material with a crosslinker compound as defined above, a solvent and an acid;
(ii) forming the article in a mold; and
(iii) desolventizing the article.

In a preferred feature the present invention contemplates a method of manufacturing a foundry core comprising mixing sand and heat-accelerated curable binder system wherein the binder system is produced by the following steps, the percentages being based on the weight of the sand:
(a) crosslinking 1–3% of saccharide-containing material with 0.1–3% of a crosslinker as defined above in about a 50% aqueous solution; and
(b) controlling the rate of reaction by the use of 0.3–1.0% of an acid as a catalyst, said mixture also comprising 0–10% clay, 0–10% silica flour, 0–10% iron oxide, and 0–2% of a material selected from the group comprising wax, wax emulsion, asphalt emulsion, and wax-asphalt emulsion.

DETAILED DESCRIPTION OF THE INVENTION

The polyols used as a binder component in the present invention are well known, and many are commercially available. More particularly, the polyols are those which react rapidly with glyoxal monourein-aldehyde condensates and are typically saccharides, such as sugars, starch, starch hydrolyzates, gums, dextrins, and the like, so long as these are water-hydratable or soluble and have available reactive groups for crosslinking. Proteins, especially glyco proteins, also can be used, again with the restriction that these are reactive with glyoxal monourein-aldehyde condensates, and, illustratively, these will include collagen protein, and the like. Preferably, the saccharide-containing material is selected from sucrose, maltose, corn syrup, corn syrup solids, glycoproteins or mixtures of any of the foregoing.

The crosslinking component used in the present invention can vary widely in type and amount. Useful such compounds will in general be of the formula (I):

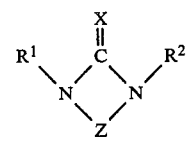

wherein X, Z, $R^1$ and $R^2$ are as defined above. This also includes low polymers of 10 to 500 repeating units.

In preferred embodiments, Z will be of the formula:

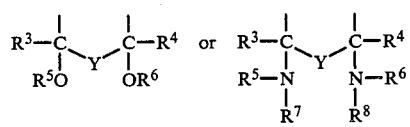

wherein $R^3$ and $R^4$ are, independently, hydrogen or organic radicals of from 1 to 30 carbon atoms, Y is a connecting carbon-to-carbon single bond or a methylene radical, and $R^5$ and $R^6$ are independent radicals and together may form a divalent radical, and $R^7$ and $R^8$ are the same as defined above for $R^1$ and $R^2$ and, in addition, hydrogen.

Special mention is made of seven especially useful crosslinkers, these are of the formulae

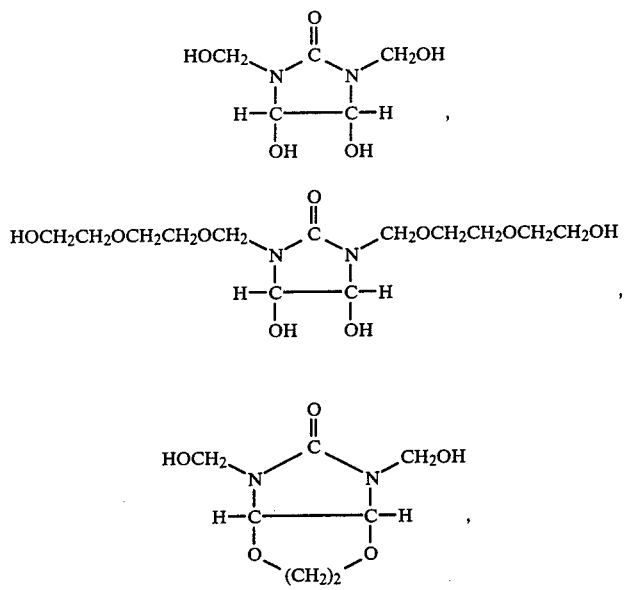

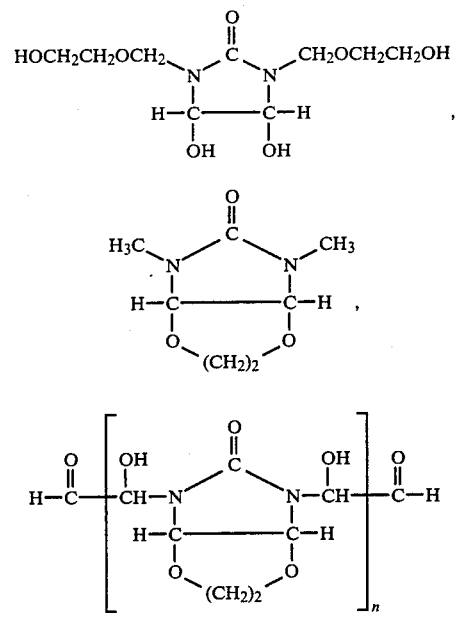

where n is about 100; and

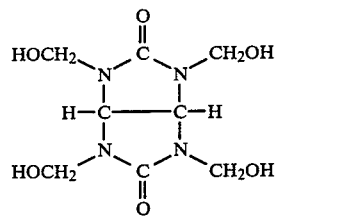

In formula (I), the divalent bridging radical, Z, can be selected from

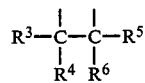

wherein $R^3$, $R^4$, $R^5$ and $R^6$ are, independently, hydrogen, alkyl, aryl or aralkyl radicals.

Z can also be

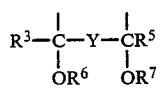

where $R^3$ and $R^5$ are as defined above; $R^6$ and $R^7$ are alkyl, hydroxyalkyl, hydroxyalkoxyalkyl, alkoxyalkyl, haloalkyl, alkylcarbonyl, haloalkylcarbonyl, alkylcarbamyl, carbamyl, or cyanoalkyl radicals; and Y is a carbon to carbon bond or a methylene radical.

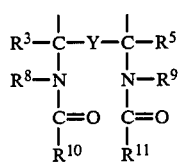

where $R^3$, $R^5$, and Y have the same designation previously assigned, $R^8$ and $R^9$ are hydrogen, alkyl or aryl radicals, and $R^{10}$ and $R^{11}$ have values assigned as for $R^3$ and $R^5$;

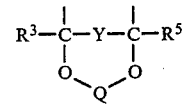

where $R^3$, $R^5$, and Y have the same designation previously assigned and Q is a divalent radical selected from methylene, alkylmethylene, ethylene, dialkoxy silicylene, carbonyl, or formyl methylene; and

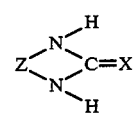

where X, $R^1$, $R^2$, $R^3$, $R^5$ and Y have the same designation previously assigned and E is Si or an alpha, omega-alkadienyl group.

The preparation of such compounds is accomplished by means known to those skilled in this art. Some are also commerically available. In one convenient way of proceeding, a monourein of formula II $$\begin{array}{c} \phantom{Z}\diagup^{\displaystyle N\diagdown}_{\displaystyle H} \\ Z \phantom{\diagup N \diagdown} C=X \\ \phantom{Z}\diagdown_{\displaystyle N\diagup}^{\displaystyle H} \end{array} \qquad \text{(II)}$$

wherein X and Z are as defined above, typically ethylene urea or a modified 4,5-dihydroxy ethylene urea, will be reacted with two or more moles of an aldehyde, especially formaldehyde, under alkaline conditions, to form the dialkylol adduct with the —NH— groups of the monourein. The adducts can be used per se. Alternatively, the monoureins of formula (II) may be reacted wih aldehydes, e.g., formaldehyde, and alcohols, e.g., methanol, under alkaline, followed by acid, conditions, to produce bis(alkoxyalkyl) adducts, which function in the same way in crosslinking with polyols, alcohols being split off instead of water. Hydroxyalkylation may be accomplished with both acid and alkaline pH's. However, pH's of 8–9 are preferred. The alkoxyalkylation should be performed, at least in the final stages, at acid pH's, and preferably at a pH of 3 to 5. Further details are provided in U.S. Pat. No. 3,209,010, and the examples herein.

Illustrative members of the family of crosslinkers represented by Formula I are:

1,3-bis-(methylol)-imidazolidone-2;
1,3-bis-(methylol)-4,5-dihydroxy ethoxyimidazolidone-2;
1,3-bis(methylol)-4,5-dihydroxyimidazolidone-2;
1,3-bis(2-hydroxyethoxymethyl)-4,5-dihydroxyimidazolidone-2;
1,3-bis(methylol)-4,5-dimethoxyimidazolidine-2;
1,3-bis(methoxymethyl)-4,5-dibenzyl-4,5-bis(perfluoroalkoxy)imidazolidone-2;
1,3-bis(methylol)-4,5-dialkoxy-2-iminoimidazolidine;
1,3-bis(methylol)-4,5-dialkyl-4,5-dialkoxy-2-thioimidazolidine;
1,3-bis(methylol)-4,6-dialkoxy-1,3-diazolidone-2;
1,3-bis(methylol)-4,6-dialkoxy-2-thio-1,3-diazolidine;
1,3-bis(alkoxymethyl)-4,6-dialkoxy-2-imino-1,3-diazolidine;
2-alkyl-4,6-bis(methylol)-1,3-dioxolano[4,5-d]imidazolidone-5;
4,6-bis-(alkoxymethyl)-2,5-dioxo-1,3-dioxolano[4,5-d]imidazolidone;
alpha, omega-bis(4,6-dimethylol-1,3-dioxolano[4,5-d]imidazolidin-2-yl)alkane;
2,2-dialkoxy-4,6-bis(alkoxymethyl)-1,3,2-dioxasilolano[4,5-d]imidazolidone-5;
2,2'-spirobi(4,6-dimethylol-1,3,2-dioxasilolano[4,5-d]imidazolidone-5);
2-butyl-4,6-dimethylol-1,3-dioxolano[4,5-d]imidazolidone-5;
1,3-dimethylol-4,5-dipropoxy-imidazolidone-2;
1,3-bis(ethoxymethyl)-4,5-bis(formamido)-4,5-dimethyl-imidazolidone-2;
1,3-bis(propoxymethyl)-4,5-bis(ethoxymethoxy)imidazolidone-2;
1,3-bis(butoxymethyl)-4,5-bis(heptadecanoxy)imidazolidone-2;
1,3-dipropylol-4,5-dimethoxy-imidazolidone-2; and
1,3-bis(ethoxypropyl)-4,5-diethoxyimidazolidone-2.

Monourein compounds of formula II, used as precursors for the compounds of formula I can be prepared in known ways. Urea can be condensed with ethylene glycol, for example to produce ethylene urea. The dihydroxy nitrogenous compounds used as precursors can be provided by condensing an alpha, beta-dicarbonyl compound, for example, glyoxal, or an alpha, gamma dicarbonyl compound, with urea, thiourea, or guanidine. The latter are then modified under acid conditions with a suitable reagent which only reacts with the hydroxy groups of the monoureins. The reaction conditions are such that the two —NH— groups of the monoureins are not affected. Both hydroxyl groups are thus modified. The reagent containing the active hydrogen group may be a mono-alcohol, monoamide, anhydride, aldehyde, isocyanate, orthoester, ester, dialdehyde or alpha-ethylenic nitrile, etc. Examples of suitable reagents are formamide, N-methylformamide, methanol, ethylene glycol, hydrated aldehydes, perfluorobutyric acid, stearamide, glycine, glycerol, and the like. Preferred such reagents are alkanols, monoamides, glycols, alkenals, mono-carboxylic acids and/or the esters of 1 to 6 carbon atoms.

The reagent containing the active hydrogen group provides a radical which becomes a part of the monourein reaction product. This can comprise a group such as alkyl, hydroxyalkyl, alkoxyalkyl, haloalkyl, alkylcarbonyl, haloalkylcarbonyl, alkylcarbamyl, carbamyl, cyanoalkyl, ethylene, alkylmethylene, dialkoxysilicylene, carbonyl, and formyl methylene. Alkyl groups, and their equivalents, can contain from 1 to 30 carbon atoms, straight-chain or branched, preferably from 1 to 6 carbon atoms. Under certain conditions two monourein molecules may form a spirobi silicon reaction product or a bis-monourein derivative of an alkene.

The reactions to modify the monoureins may be carried out in water, inert solvents, or in excess of reagent until water is split off. Further details are in the appended examples herein, as well as in the above-mentioned patent, U.S. Pat. No. 3,209,010.

When $R^1$ and $R^2$ are groups other than hydroxyalkyl or hydroxyalkyloxyalkyl, then suitably substituted urea or urea analogs can be used to provide aryl and alkyl as well as substituted alkyl groups in these positions. Procedures to accomplish this are known, for example, from Beachem, U.S. Pat. No. 3,304,312. Suitable procedures are also set forth hereinafter in connection with the preparation of illustrative compounds.

The catalyst or accelerator employed is an acidic type catalyst and may be a free inorganic or organic acid, acid salt, alkanolamine salt and the like of the type well known to those in the art. See, for example, Beachem, U.S. Pat. No. 3,304,312. The concentration of catalyst employed can range from about 0.1 to about 25% or higher, based on the weight of the solids in the binder, depending on the particular catalyst type employed. Thus, for example, from between about 0.1% and about 10% of a free acid such as sulfuric, hydrochloric, acetic, phosphoric, tartaric, oxalic or the like may be used, while in the case of ammonium chloride amounts of from between 0.5 and 10% can be used. In the case of amine salts, such as alkanolamine salts, e.g., diethanolamine hydrochloride from about 1 to about 10% are most useful, while with respect to salts such as magnesium chloride amounts of between about 0.5 and 25% have been successfully employed. In addition to magnesium chloride, zinc nitrate, aluminum chloride and other known conventional metal salts are normally employed in amounts which can correspond to between 0.5 and 25% based on the weight of the solids in the binder composition. Preferred for the invention are Lewis acid salts. These denote a family of metal salts which are electron pair acceptors. They comprise halides, nitrates, sulfates, mixed halides/hydroxides, and the like, of metals such as iron, tin, phosphorus, arsenic, antimony, bismuth, zinc, aluminum, magnesium, boron and the like. Typical examples of Lewis acid salts are $FeCl_3$, $SnCl_4$, $PF_5$, $AsF_5$, $SbF_5$ and $BiCl_3$, as well as $Zn(NO_3)_2$, $MgCl_2$, $Mg(NO_3)_2$, $Al_2(SO_4)_3$, $AlCl_x(OH)_y$, x+y=3, mixtures thereof, and the like. Preferred Lewis acid salt catalysts for use herein are zinc nitrate and magnesium nitrate.

In the production of foundry cores, there are a number of different methods for applying heat to the formed cores to bring about a cure of the binder. These include cold forming followed by baking of the cores, forming the cores in heated patterns, sometimes called a hot box, and forming the cores in a pattern or box followed by forcing heated air through the core.

This invention can be used in any of the above methods. The advantages of this invention are (i) the use of aqueous solvents which emit no odors or noxious fumes (ii) that the binder system presents no air or water pollution hazards, and, especially, (iii) the hydrolytic stability of the bonded article is very high.

A bonded particulate article manufactured by the method of the present invention may preferably comprise 80%–99% particulate matter and 1%–20% binder system, with the latter being comprised of 20%–55% saccharide material, 3%–60% of crosslinker, 0.2–10% of Lewis acid salt and 15–85% of solvent, by weight. If water is the solvent part of the content can be contributed by water in the sand. Part also can be contributed by any solvent in which the crosslinker is contained.

A preferred method of manufacturing a foundry core under the present invention comprises the steps of mixing sand and a heat-accelerated curable binder system wherein the binder system is produced by the following steps, weight percentages being based on 100 parts of sand: crosslinking 1%–3% of saccharide-containing matter with 0.1–3% of a crosslinker compound as defined above in a 24–90% aqueous solution, controlling the reaction by the use of 0.3%–10% of an acid as a catalyst using 0%–10% kaolin, or other clay for green strength, 0%–10% wood flour, 0%–10% silica flour, 0%–10% iron oxide (as optional fillers), and 0%–1% of a material selected from the group comprising wax, wax emulsion, asphalt emulsion or wax-asphalt emulsion (as optional flow promoters and/or mold releases); and forming the mixture to desired shape and causing it to cure to a hardened state. Preferred compositions include a release agent. This can comprise a mixture of the paraffin solvent alone or including a fatty acid. A useful such composition is a mixture of kerosene and oleic acid in a weight ratio of from about 8:1 to 1:1. The amount used can vary but preferably is from 0.05 to 2% based on the sand, by weight.

In manufacturing a resinlike material with the present invention the method may include mixing a filler material and a heat-accelerated curable binder system, the binder system having been produced by cross-linking a saccharide-containing substance with a heterocyclic crosslinker as defined above in the presence of an amount of an acid salt effective to maintain the reaction. The method of mixing can vary, but generally will include the following steps: (i) dissolving or dispersing the acid, saccharide-containing substance and a heterocyclic compound in water; and (ii) causing the mixture to react by the application of heat. In one preferred way of operating, prior to application of heat, up to 80% of the weight of the binder system of fillers, pigments and extenders are dispersed in the system. Even more preferred, is to premix up to 80% of the weight of the binder system of fillers, pigments and extenders with the saccharide material, then to add the cross linker and the acid in admixture.

Curing of the core will be at conventional operating conditions, e.g., 5–180 seconds in a hot box, operated at between 250°–550° F. The core usually will be removed from the form and dried in an oven. Preferably, the core will be post-cured in a microwave oven.

If the binder system is used with other fillers to make other shaped articles, practices entirely conventional in those arts will be used. Merely by way of illustration, the crosslinker and acid can be slurried in warm water with wood fibers. Then corn flour can be added and blended. Dewatering on a vacuum filter gives a damp preform which can be pressed and cured at 230° F. for 20 minutes to produce a pressed fiberboard with a hard, glossy surface.

The following procedures are used to prepare materials used in the working examples.

PROCEDURE A

A hydrolyzed amylaceous starch is made by the procedure of Example 25 of U.S. Pat. No. 4,158,574.

Eight 500 gm samples of yellow corn flour are blended with 0.2 to 0.4% $H_2SO_4$ and tempered to 18–24% moisture. After addition of acid and water, the samples are blended for 20 minutes in a Hobart mixer at low speed. The samples are then processed in a laboratory extruder employing a 220° F. rear barrel temperature and 280° F. for the discharge end $\frac{1}{8}$ length. The extruder is run at 50 rpm with a 2:1 compression screw. The extruded samples are cooled to room temperature and ground on a hammermill. The 10% slurry of the sample gives a pH of 3.5–4.1. The products are then tested for cold water solubles and alkaline viscosities.

A typical product has a cold water solubles (CWS) of 12.8%, an alkaline viscosity of 20.3 seconds (1.3 g. of sample). After extrusion it has a CWS of 84.3% and an alkaline viscosity of 13.6 seconds (1.3 g. sample).

PROCEDURE B (RP-1)

A reaction product comprising glyoxal, urea and formaldehyde is prepared by the following procedure:

A mixture of one mole of glyoxal (as a 40% aqueous solution) and 2 moles of formaldehyde (as a 44% aqueous solution) is adjusted to a pH of 6.4–6.5 with sodium bicarbonate. To this is added one mole of urea and the mixture is heated to 60° C. maintaining the pH at 6.4–6.5 by frequent additions of sodium bicarbonate. When the free formaldehyde content by analysis drops to 1% the reaction mixture is cooled, the pH adjusted with hydrochloric acid and water is added to adjust the solids content to 44–45%.

The compound has the formula

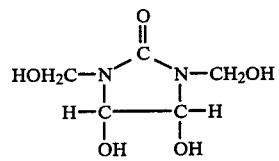

PROCEDURE C-1 (RP-2)

A reaction product comprising glyoxal, urea, formaldehyde and ethylene glycol is prepared by the following procedure:

In a reaction vessel, one mole of glyoxal (40.3% glyoxal, 4.7% aqueous solution) is mixed with two moles of formaldehyde (50% formalin aqueous solution), one mole of urea and 1.5 moles of ethylene glycol. The pH of the mixture is adjusted by addition of NaOH to a value in the range of 6 to 7 and is maintained in that range while the mixture is reacted at 60° C. for three hours. Then about 0.5% by weight of citric acid, based on the weight of the finished product, is added to the mixture and the pH is adjusted to 3.0 by the addition of H₂SO₄. The temperature of the mixture is maintained at 60° C. for one hour, then cooled to about 25° C. and the pH is finally adjusted to about 4.5 to 5.5 by the addition of NaOH to make the finished product solution (solids content 35–60% by weight).

The compound has the formula

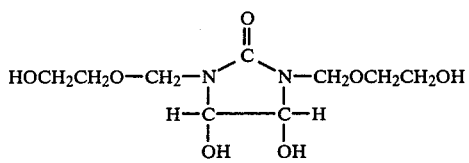

PROCEDURE C-2 (RP-2)

As an alternate to C-1, the following procedure is suitable:

In a reaction vessel, one mole of glyoxal (40.3% glyoxal, 4.7% formaldehyde aqueous solution) is mixed with two moles of formaldehyde (50% formalin aqueous solution), and one more of urea. The pH of the mixture is adjusted by the addition of NaOH to a value in the range of 6 to 7 and is maintained at that range while the mixture is reacted at 60° C. for three hours. Then 1.5 moles of ethylene glycol is added. Then about 0.5% by weight of citric acid, based on the weight of the finished product, is added to the mixture and the pH is adjusted to 3.0 by addition of H₂SO₄. The temperature of the mixture is maintained at 60° C. for one hour, then cooled to about 25° C. and the pH is finally adjusted to about 4.5 to 5.5 by addition of NaOH to make the finished product solution (solids content 35–60% by weight).

PROCEDURE D

A reaction product comprising glyoxal, urea, formaldehyde and diethylene glycol is prepared by modifying procedure C-1 above to substitute 1.5 moles of diethylene glycol for ethylene glycol.

The compound has the formula:

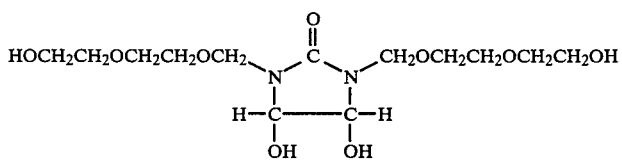

PROCEDURE E

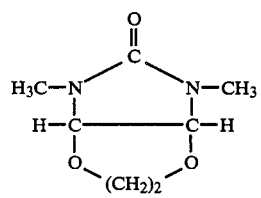

A mixture of 105 parts (0.6 mole) of 30% aqueous glyoxal, with the pH adjusted to 7.0 by adding sodium hydroxide, and 44 parts (0.5 mole) of 1,3-dimethylurea is stirred at room temperature for several hours, during which time 4,5-dihydroxy-1,3-dimethyl-2-imidazolidinone is formed. To this is added 0.5 mole of ethylene glycol and the pH is adjusted to below 4 with concentrated hydrochloric acid. After the solution has been stirred at 20°–25° C. for about 5 minutes, barium hydroxide is added to neutralize. After filtration and evaporation, the product remains as a residue, suitable for use in this invention.

PROCEDURE F

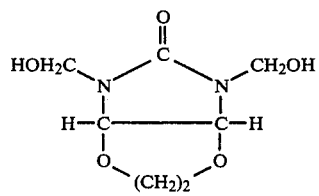

A reaction product comprising glyoxal, urea, formaldehyde and ethylene glycol is prepared by the following procedure:

Stage 1.—465 parts of 75% glyoxal (6 moles) are added to 300 parts of water in a resin reaction vessel and heated to 70° C. until all of the glyoxal has dissolved. The solution is cooled to 30° C. and 360 parts of urea (6 moles) are added thereto. By heating and cooling the reaction mixture is kept at 50° C. for 2 hours at pH 4.3. The mixture is cooled to 25° C. and neutralized to pH 7.1 with dilute NaOH. Analysis for glyoxal shows that only 1.72% remains and that the reaction to form the 4,5-dihydroxy-ethylene urea is 94% completed. The resulting solution is stripped under reduced pressure to eliminate all water.

Stage 2.—30 parts of crystalline 4,5-dihydrodroxyethylene urea prepared as in Stage 1 (0.25 mole) and 26.5 parts of ethylene glycol (0.25 mole) are mixed together. The pH is adjusted to 4.0 with methyl phosphoric acid and the mixture is heated. After 10 minutes heating at 80° C., a homogeneous clear product is obtained. The reaction is allowed to continue at 80° C. for two hours. After cooling to 25° C., the ethylene glycol addition product is obtained.

Stage 3.—74 parts of the ethylene glycol adduct of 4,5-dihydroxyethylene urea (0.25 mole) are mixed with 2240 parts of 37% formaldehyde solution (0.50 mole). The pH of the mixture is adjusted to 10.0 with dilute NaOH. After 2 hours heating at 50° C., the solution is cooled to 25° C. and neutralized to pH 7.4 with dilute HCl to form the product of the above formula.

PROCEDURE G

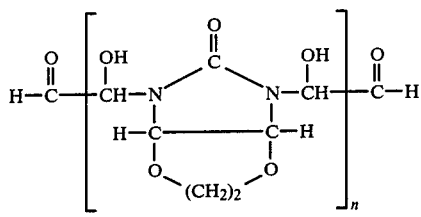

A urea formaldehyde low polymer resin terminated with aldehyde groups is reacted at 50° C., pH 4.3 with an equimolar amount of glyoxal. The pH is reduced to 4.0 with acid and an equimolar amount of ethylene glycol is added and the solution stirred at 20°-25° C. for about 5 minutes, then the solution is neutralized with barium hydroxide and filtered to form a solution of the product with the above formula, with an average of about 100 repeating units.

PROCEDURE H

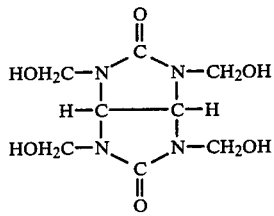

Two moles of urea and one mole of glyoxal are reacted at 50° C. for 2 hours at pH 4.3. The adduct one mole is mixed with four moles of 37% aqueous formaldehyde, and the pH is adjusted to 10 with dilute NaOH. The mixture is heated to 50° C. for 2 hours, cooled to 25° C. and neutralized to pH 7.4 with dilute HCl to produce an aqueous solution of a compound of the above formula.

PROCEDURES I-X

The procedures of U.S. Pat. No. 3,209,010, Examples 1-16, can be used to prepare the following compounds suitable for use as crosslinkers in the present invention:

1,3-dimethylol-4,5-bis(hydroxyethyloxy)imidazolidone-2 (Procedure I);
1,3-dimethylol-4,5-dimethoxyimidazolidone-2 (Procedure J);
2-propyl-4,6-bis(methylol)-3-dioxolano[4,5-d]imidazolidone-5 (Procedure K);
1,3-bis(methoxymethyl)4,5-bis(formanido)imidazolidone-2 (Procedure L);
1,3-bis(methoxymethyl)-4,5-bix(acetoxy)imidazolidone-2 (Procedure M);
1,3-bis(methoxymethyl)-4,5-bis(methoxymethoxy)-imidazolidone-2 (Procedure N);
and
2,2-diethoxy-4,6-bis(isopropoxymethyl)1,3,2-dioxasilolano[4,5-d]imidazolidone-5 (Procedure O);
3 alpha, 6 alpha-dimethyl-4,6-bis(methoxymethyl)-1,3-dioxalano[4,5-d]imidazolidone-5 (Procedure P);
1,3-bis(methoxymethyl)-4,5-bis-stearyloxy-4-methyl-imidazolidone-2 (Procedure Q);
1,3-bis(butoxymethyl)-4,5-diphenyl-4,5-dibutoxy-2-thio-imidazolidine (Procedure R);
1,3-bis(ethoxymethyl)-4,5-dimethyl-4,5-diethoxy-2-imino-imidazolidone (Procedure S);
1,3-bis(methoxymethyl)-4,5-bis(perfluorononyl carboxyl)-imidazolidone-2 (Procedure T);
1,3-bis(methoxymethyl)-4,5-dimethoxyimidazolidone-2 (Procedure U);
2-formyl-4,6-bis(methoxymethyl)-1,3-dioxolano[4,5-d]imidazolidone-5 (Procedure V);
1,3-bis(methoxymethyl)-4,5-dimethyl-4,5-bis(perfluoroethoxy)imidazolidone-2 (Procedure W); and
1,3-dimethylol-4,5-bis(hydroxymethyloxy)-imidazolidone-2 (Procedure X).

PROCEDURE Y-II

The procedures of U.S. Pat. No. 3,304,312, Examples 1-11, can be used to prepare the following compounds suitable for use as crosslinker in the present invention:

4,5-dihydroxy-1,3-dimethyl-imidazolidone-2 (Procedure Y);
4,5-dihydroxy-1,3-di-n-propyl-imidizalodone-2 (Procedure Z);
4,5-dihydroxy-1,3-diisobutyl-imidazolidone-2 (Procedure AA);
4,5-dihydroxy-1,3-diphenyl-imidazolidone-2 (Procedure BB);
4,5-dihydroxy-1,3-diphenyl-2-thioimidazolidone (Procedure CC);
4,5-dimethoxy-1,3-dimethyl-2-imidazolidone-2 (Procedure DD);
4,5-diethoxy-1,3-dimethyll-imidazolidone-2 (Procedure EE);
4,5-diisopropoxy-1,3-dimethyl-imidazolidone-2 (Procedure FF);
1,3-bis(2-cyanoethyl)-4,5-dimethoxyimidazolidone-2 (Procedure GG);
1,3-bis(2-carbamoxylethyl)4,5-dimethoxyimidazolidone-2 (Procedure HH);
and
1,3-bis(2-carbethoxymethyl)-4,5-dimethoxyimidazolidone-2 (Procedure II).

DESCRIPTION OF THE PREFERRED EMBODIMENTS

The following Examples illustrate the present invention, but are not intended to limit the claims.

The sand mixes in the examples are made in a Simpson Sand Muller. Silica sand and the polysaccharide are dry blended for 30 to 90 seconds. Water is added and the system blended for two minutes. An aqueous solution of the respective heterocyclic crosslinkers of Procedures B-H and acid as specified is then added and the system is blended for two minutes. The Standard American Foundry Society 1-inch tensile briquets are then prepared by hand ramming into the tensile core boxes. The resulting 1" thick dog-bone shaped cores are baked at 350° F. for 30 minutes. Tensile strength is measured after 2 hours using a Detroit Testing Machine Company Model CST testing machine.

EXAMPLE 1

Based on 100 parts by weight of sand, 2% of amylaceous starch (cereal), 0.5% of the reaction product (RP-1) of glyoxal, urea and formaldehyde (Procedure B) and 0.03% of zinc nitrate and 2.5% of water are mixed, molded, cured and tested.

For comparison purposes, mixtures omitting the crosslinker and the Lewis acid salt, and omitting the Lewis acid salt, respectively, are prepared. The results are as follows:

| Example | % Cereal | % RP-1** | % Zn(NO$_3$)$_2$ | % H$_2$O | Tensile Strength (psi) |
|---|---|---|---|---|---|
| 1A* | 2 | 0.0 | 0.0 | 2.5 | 56 |
| 1B* | 2 | 0.5 | 0.0 | 2.5 | 63 |
| 1 | 2 | 0.5 | 0.03 | 2.5 | 280 |

*Control
**Based on solids, 44% in water.

The foregoing results demonstrate the advantageous results achieved by the three-component binder system. To further demonstrate the advance in the art provided by the present invention, hydrolytic stability tests were carried out. The test cores in the form of dog bone specimens prepared according to Example 1 were made and for comparison purposes specimens prepared according to Example 2 of U.S. Pat. No. 4,098,615, which employed glyoxal as a crosslinker were made. Tensile strengths were measured two hours after production and then exposure to 80% relative humidity at 80° F. for 16 hours. The formulations used and the results obtained are set forth as follows:

| Example | % Cereal | % Crosslinker | % Catalyst | % H$_2$O | Tensile Strength (psi) as made | Tensile Strength (psi) 80% RH exposed |
|---|---|---|---|---|---|---|
| 1 | 2.0 | 0.5 RP-1 | 0.03 Zn(NO$_3$)$_2$ | 2.5 | 280 | 200 |
| 1C* | 2.0 | 0.6 Glyoxal | 0.5 NaCl | 2.8 | 274 | 50 |

The results show that the bonded articles with substantial hydrolytic stability resistance are provided. This permits their use in environments, such as foundrys, with high ambient humidities.

EXAMPLES 2-4

The procedure of Example 1 is repeated. The amounts of RP-1, Zn(NO$_3$)$_2$ and H$_2$O are the same as used in Example 1 and the hydrolyzed cereal is replaced in stages with a conventional cereal. The following results are obtained:

| Example | % Cereal | % CC* | Tensile Strength (psi) |
|---|---|---|---|
| 2 | 1.88 | .12 | 195 |
| 3 | 1.5 | .5 | 103 |
| 4 | 0 | 2 | 82 |

*Acid modified corn starch (Krause Milling Co. "Amerikor" brand).

Substitution of conventional cereals for the hydrolysed cereal in Example 1 results in a lower core tensile strength. However Examples 2-4 demonstrate that a conventional cereal (CC) can successfully be added in place of some or all of the hydrolyzed amylaceous starch. Other conventional cereals which can be used include wheat flour, rye starch, and the like.

EXAMPLES 5-7

The procedure of Example 1 is repeated with the exception that the amount of RP-1 is increased.

| Example | % Cereal | % RP-1 | Tensile Strength (psi) |
|---|---|---|---|
| 5 | 2 | .60 | 335 |
| 6 | 2 | .65 | 367 |
| 7 | 2 | .75 | 420 |

It is seen that tensile strength increases with the level of RP-1.

EXAMPLE 8

A core is prepared as in the manner of Example 1 except it is prepared in a hot box and is post-cured in a microwave oven for 30 sec. The core tensile strength is 330 psi, demonstrating the beneficial effect of using a microwave oven.

EXAMPLE 9

A sand core is prepared as described in Example 1 except that magnesium nitrate is substituted for zinc nitrate and the reaction product from glyoxal, urea, formaldehyde and ethylene glycol (RP-2, Procedure C-1) is used in place of RP-1. The resulting tensile strength is 207 psi, demonstrating the beneficial effect of this system. If RP-2 made by the process of Procedure C-2 is used, substantially the same results will be obtained.

EXAMPLE 10

If the following composition is made: 16 g. of RP-1 and 4 g. of zinc nitrate in 600 ml. of warm water is formed into a slurry with 80 g. of wood fibers. Twenty g. of acid modified corn flour is then intimately blended into the fiber slurry to insolubilize the RP-1. Then if this mixture is dewatered on a vacuum filter there should be produced a preform which can be pressed and cured at about 230° F. for 20 minutes into a finished board having a hard, glossy surface.

EXAMPLE 11

Based on 100 parts by weight of sand, 2% of starch (cereal), 0.5% of the reaction product (RP) of glyoxal, 1,3-dimethyl urea, and ethylene glycol (Procedure D) and 0.03% of zinc nitrate and 2.5% of water are mixed, molded, cured and tested.

The specimens have excellent tensile strength and good resistance to loss of tensile strength after exposure to 80% relative humidity at 80° F. for 16 hours.

EXAMPLES 12-14

The procedure of Example 11 is repeated, the amounts of reaction product, Zn(NO$_3$)$_2$ and H$_2$O being the same as used in Example 11 and the hydrolyzed cereal is replaced in stages with a conventional cereal.

| Example | % Cereal | % CC |
|---|---|---|
| 12 | 1.88 | .12 |
| 13 | 1.5 | .5 |
| 14 | 0 | 2 |

Substitution of conventional cereals for the hydrolysed cereal in Example 1 should result in a lower core tensile strength. However Examples 12-14 should demonstrate that a conventional cereal (CC) can successfully be added in place of some or all of the hydrolyzed amylaceous starch.

EXAMPLES 15-17

If the procedure of Example 11 is repeated with the exception that the amount of reaction product is increased, the following formulations can be obtained.

| Example | % Cereal | % RP |
| --- | --- | --- |
| 15 | 2 | .60 |
| 16 | 2 | .65 |
| 17 | 2 | .75 |

Increasing the amounts of reaction product will increase the tensile strength of the samples.

EXAMPLE 18

If a core is prepared as in the manner of Example 11 except it is prepared in a hot box and is post-cured in a microwave oven for 30 sec, the core tensile strength should increase, and thus demonstrate the beneficial effect of using a microwave oven.

EXAMPLE 19

The procedure of Example 11 is repeated substituting for the crosslinker the reaction product of glyoxal, urea, ethylene glycol and formaldehyde (Procedure F). Specimens with excellent tensile strength and good resistance to atmospheric humidity will be obtained.

EXAMPLE 20

The procedure of Example 11 is repeated substituting for the crosslinker an oligomeric reaction product of glyoxal, urea, ethylene glycol and formaldehyde (Procedure G). Specimens with excellent tensile strength and good resistance to atmospheric humidity will be obtained.

EXAMPLE 21

The procedure of Example 11 is repeated substituting for the crosslinker a reaction product of glyoxal, two moles of urea and four moles of formaldehyde (Procedure H). Specimens with excellent tensile strength and good resistance to atmospheric humidity will be obtained.

EXAMPLE 22

If the following composition is made: 16 g. of the reaction product of Procedure D and 4 g. of zinc nitrate in 600 ml. of warm water is formed into a slurry with 80 g. of wood fibers. Twenty g. of wheat flour is then intimately blended into the fiber slurry to insolubilize the reaction product. Then if this mixture is dewatered on a vacuum filter there should be produced a preform which can be pressed and cured at about 230° F. for 20 minutes into a finished board having a hard, glossy surface.

In concurrently filed related application of different inventive entities cited above are claimed binder compositions described in Examples 1-10, herein.

The foregoing patents, publications and copending application are incorporated herein by reference.

Many variations of this invention will suggest themselves to those skilled in this art in light of the above, detailed description. For example, instead of wood fiber or sand, clay, sawdust, wood chips and wood particles can be used. Instead of the polyols exemplified, there can be used corn syrup, corn syrup solids, glyco proteins, hydrolyzed pregelled starches and flours other than corn starch and corn flour, mixtures of any of the foregoing, and the like. Instead of water as a solvent, lower alcohols including, but not limited to, methanol, ethanol or isobutanol can be used, as well as dioxane, methylene chloride, dimethylformamide and others known in this art; water is preferred. Instead of Lewis acid salts other acids can be used, including Bronsted acids. All such obvious variations are within the full intended scope of the appended claims.

We claim:

1. A curable composition adapted to produce a shaped bonded particulate article, said composition comprising
    (i) a major amount of a particulate material; and, in a minor amount, as a binder therefor,
    (ii) A polyol selected from a saccharide, a saccharide polymer, a glyco protein, or mixtures of any of the foregoing;
    (iii) a crosslinker for said polyol (ii) comprising a compound of the formula

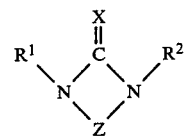

wherein $R^1$ and $R^2$ are, independently, aryl of from 6 to 12 carbon atoms, alkyl of from 1 to 6 carbon atoms or substituted alkyl of from 1 to 6 carbon atoms wherein the substituting group is hydroxy, alkoxy of from 1 to 6 carbon atoms, hydroxyalkoxy of from 1 to 6 carbon atoms, cyano, carboxy, carbalkoxy of from 1 to 7 carbon atoms of carbamoyl, or when $R^1$ is $-C_xH_{2x}-$, $R^2$ is $-C_xH_{2x}O-$, x being from 1 to 6, X is oxygen, sulfur or imino and Z is a divalent bridging radical;
    (iv) an acid catalyst; and
    (v) a solvent for the binder.

2. A curable composition as defined in claim 1 wherein particulate material (i) comprises 80%-99% by weight and said binder comprises from 1%-20% by weight, the amount of polyol (ii) in said binder comprising 20%-55%; the amount of crosslinker (iii) in said binder comprising 3%-60%; the amount of acid (iv) in said binder comprising 0.2%-10% and the amount of solvent (v) in said binder comprising 15%-85%, all percentages being by weight.

3. A curable composition as defined in claim 1 wherein the particulate material (i) is sand.

4. A curable composition as defined in claim 1 wherein the polyol (ii) is selected from sucrose, maltose, corn syrup, corn syrup solids, glyco proteins, or a mixture of any of the foregoing.

5. A curable composition as defined in claim 1 wherein in said crosslinker (iii) Z is of the general formulae

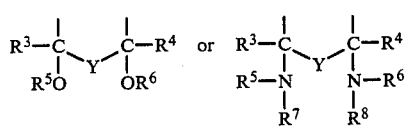

wherein $R^3$ and $R^4$ are, independently, hydrogen or organic radicals of from 1 to 30 carbon atoms, Y is a connecting carbon-to-carbon single bond or a methylene radical, and $R^5$ and $R^6$ are independent radicals and together may form a divalent radical, and $R^7$ and $R^8$ are the same as defined above for $R^1$ and $R^2$ and, in addition, hydrogen.

6. A composition as defined in claim 5 wherein said crosslinker is of the formula:

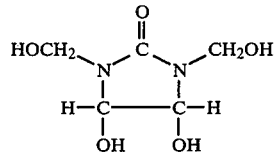

7. A composition as defined in claim 5 wherein said crosslinker is of the formula:

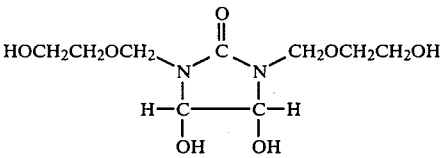

8. A curable composition as defined in claim 1 wherein said acid is an inorganic acid, an organic acid, a Lewis acid, a Bronsted acid or a metal or non-metal salt which acts as an acid.

9. A curable composition as defined in claim 1 wherein said solvent is water.

* * * * *